United States Patent Office 2,967,166
Patented Jan. 3, 1961

2,967,166

COPOLYMERIZATION METHOD

Gus C. Mustakas and Edward L. Griffin, Jr., Peoria, Ill., assignors to the United States of America as represented by the Secretary of Agriculture No Drawing. Filed May 13, 1959, Ser. No. 813,040

5 Claims. (Cl. 260—23)

(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention is directed to a commercially advantageous method of forming and obtaining superior, clear, water-white, film-forming linear copolymers formed in a stannic chloride-catalyzed copolymerization of soybean polyunsaturated vinyl ethers and a lower alkyl vinyl ether. Baked films of these copolymers have good resistance to acids, alkalis, and solvents. Since they are strongly adherent to metal, the baked films have utility as can coatings for foods.

One object of the invention is a method which permits quenching the polymerization reaction in an organic solvent, without forming a gelatinous, vessel-adhering, and separation-resistant emulsion of stannic acid and which at the same time completely destroys the definite yellow color developed in the polymer by the highly reactive carbonium ion.

Another object of the improved method of this invention is the simplified and complete, and trouble-free removal of the substantially inactivated but potentially damaging stannic ions from the copolymer liquor.

In our first attempt to prepare and purify the above copolymers, we quenched the polymerization reaction with hydrous methanol since U.S. Patent No. 2,380,394 to Berger teaches that water is an effective inactivator of Friedel-Crafts catalysts. This immediately produced an opaque, sticky, gelatinous emulsion of stannic acid which prevented substantially complete gravity drainage, necessitated hand-scrubbing of the reaction vessel, and required a large series of extractive washes to remove the precipitate from the polymer. It was necessary to dehydrate the reactor before reuse. The purified copolymer was yellow in color.

Subsequent preparations of the above described copolymers incorporated the method step modifications constituting the instant invention, namely, the use of absolute methanol or homologous lower alkanol as the polymerization quenching agent followed by the addition of a hydrated alkaline earth metal hydroxide such as hydrated lime which forms a directly filterable precipitate with the unwanted stannic ions.

Thus, the simplified method consists of the steps of anhydrously polymerizing the lower alkyl vinyl ether and soybean vinyl ether in molar proportions of about 3:1 in the presence of about 0.25 percent (based on total monomer weight) of stannic chloride catalyst and in the further presence of a neutral solvent such as toluene, terminating or quenching the polymerization reaction with anhydrous methanol, precipitating the stannic ion with an alkaline earth metal hydroxide such as hydrated lime, barium hydroxide, or magnesium hydroxide and a trace of water, filtering the precipitate so formed, and recovering the pure copolymer by stripping with nitrogen under reduced pressure. It is further pointed out that turbo-agitation is employed through the quenching step, and that its use is responsible for limiting the color development to a slight, methanol-decolorizable yellowing rather than to an intense yellowing which is too strong to be decolorized or even substantially lightened by the alcohol quench.

The process improvements result in a significant reduction in time and number of process steps.

Previously, catalyst removal required four or more extraction, settling, and decantation steps using aqueous methanol. By the older process, the methanol would need to be separated from the catalyst and recovered by fractional distillation. The reaction vessel would then require dehydration by heating or by some other means before reuse. It would be difficult and costly to develop a continuous process using these procedures.

By the method of our invention, clear water-white polymer solutions are produced directly after polymerization. The reactor is then easily drained, washed with methanol and recharged. No dehydration of the reactor is required. Precipitation of the catalyst is conducted in one step. Since the quantity of catalyst used is very small, its recovery is not economically justified. The precipitation of catalyst with low cost lime hydrate therefore offers an efficient disposal treatment. As a result of these modifications, a low cost polymerization process has been developed which can be easily adapted to continuous production methods.

A unique advantage of this method is realized when viscous solutions are produced in the polymerization. Under these conditions, catalyst recovery by solvent extraction becomes very difficult and a large number of extraction steps are required, whereas, precipitation with hydrated lime can still be carried out conveniently.

Example 1

Fifty grams (0.17 mole) of conjugated soybean vinyl ether and 51.5 grams (0.51 mole) of isobutyl vinyl ether were dissolved in 300 ml. of anhydrous toluene in a reaction vessel equipped with a turbo-agitator and a thermometer. The vapor space in the reaction vessel was purged with nitrogen and agitation was instituted. An exothermic polymerization reaction (starting at 21° C.) commenced upon adding 6 ml. of a 4 percent stannic chloride solution in toluene, and the temperature reached a maximum at 86° C. in 24 seconds. The catalyst was deactivated and the polymerization quenched by adding 50 ml. absolute methanol, resulting in a clear, decolorized, single phase solution. The contents of the reaction vessel were permitted to cool to room temperature. Conventional mixing replaced turbo-agitation and hydrated lime (5 gms.) with 5 ml. of water was introduced into the reaction chamber and the contents were then mixed for 30 minutes before filtering with a small amount of "Filter-Cel" to improve the rate. The filtrate was stripped with nitrogen under reduced pressure on a steam bath and gave a clear, water-white polymer having a molecular weight of 7690, a D.P. (degree of polymerization) of 52.0, a Gardner color index of 1.0, and a Gardner viscosity index of Z6+.

Example 2

Conjugated soybean vinyl ether (57.5 gms. or 0.197 mole) and ethyl vinyl ether (42.5 gms. or 0.590 mole) were dissolved in 300 ml. anhydrous toluene and placed in a reaction vessel equipped with a turbo-agitator and thermometer. The vapor space in the reaction chamber was purged with nitrogen and agitation was begun. The copolymerization reaction was then initiated at 21° C. upon the rapid addition of 6 ml. of 4 percent stannic chloride dissolved in toluene. The temperature rose to a maximum of 80° C. within 30 seconds, and the catalyst was deactivated with 50 ml. absolute methanol. The promptly de-yellowed water-white solution was cooled to room temperature and hydrated lime (5 gms.) was added along with 5 ml. of water. Following filtration, the solvents were removed by stripping with nitrogen under reduced pressure to yield the pure, clear copolymer characterized by a D.P. of 40.4, Gardner color index of 1.0, and a Gardner viscosity of Z6+.

We claim:

1. The method for producing a copolymer of an aliphatic conjugated soybean oil vinyl ether and a lower alkyl vinyl ether which comprises reacting an aliphatic conjugated soybean oil vinyl ether and a lower alkyl vinyl ether under anhydrous conditions in the presence of an organic solvent and stannic chloride catalyst, quenching the copolymerization reaction by adding an absolute lower alkanol to the reaction mixture, precipitating the stannic ions from the copolymer liquor with a hydrated alkaline earth metal hydroxide, and recovering the pure stable copolymer from the reaction mixture.

2. The method of claim 1 wherein the polyunsaturated soybean oil vinyl ether and the lower alkyl vinyl ether are present in molar ratios of about between 1:1 and 1:3.

3. The method of claim 1 wherein the alkaline earth metal hydroxide is calcium hydroxide.

4. The method of claim 1 wherein the lower alkanol is methanol.

5. The method of claim 1 wherein the lower alkyl vinyl ether is a member of the group consisting of ethyl vinyl ether and isobutyl vinyl ether, the lower alkanol is methanol, and the alkaline earth metal hydroxide is calcium hydroxide.

References Cited in the file of this patent

UNITED STATES PATENTS

| | | |
|---|---|---|
| 2,513,820 | Schildknecht | July 4, 1950 |
| 2,684,345 | Yuska | July 20, 1954 |